No. 621,451. Patented Mar. 21, 1899.
W. L. FOOTE.
TIRE FOR BICYCLES.
(Application filed May 6, 1898.)
(No Model.)
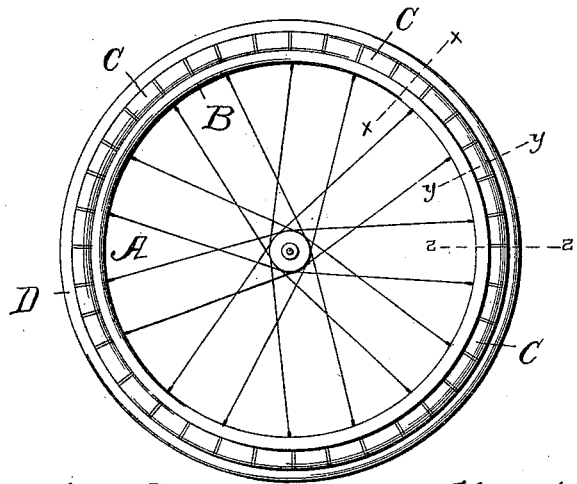
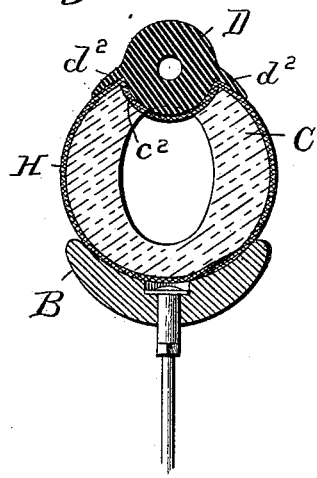
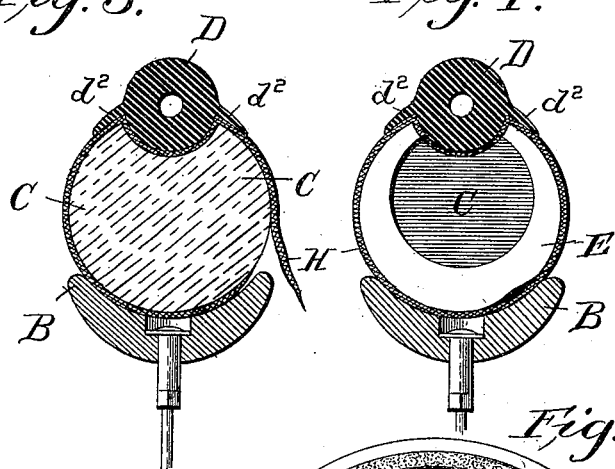
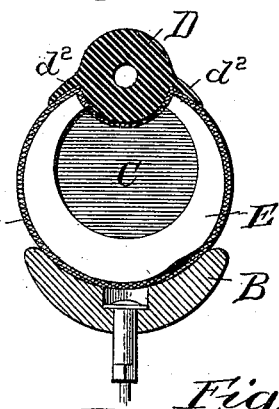
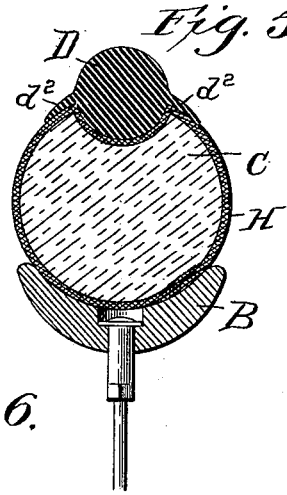
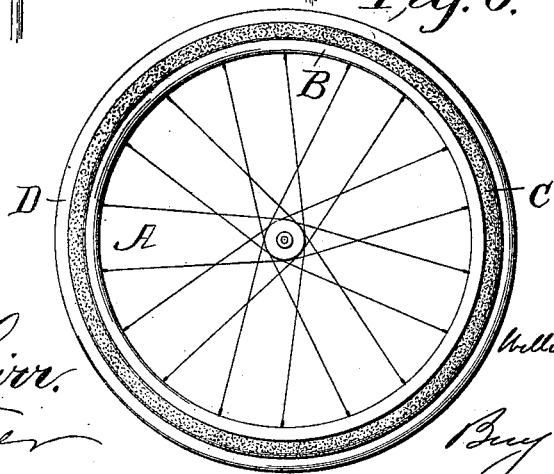
Witnesses.
Inventor.
William Lennard Foote
by
Benjamin Price
Attorney.

UNITED STATES PATENT OFFICE.

WILLIAM LENNARD FOOTE, OF NEW YORK, N. Y.

TIRE FOR BICYCLES.

SPECIFICATION forming part of Letters Patent No. 621,451, dated March 21, 1899.

Application filed May 6, 1898. Serial No. 679,887. (No model.)

*To all whom it may concern:*

Be it known that I, WILLIAM LENNARD FOOTE, of New York, (Brooklyn,) State of New York, have invented a new and useful Improvement in Tires for Bicycles and other Vehicles, of which the following is a full description.

The accompanying drawings illustrate the invention, of which—

Figure 1 is a view of a wheel with the tire built up in cork, alternating with solid and perforated sections, and having interposed a layer of rawhide, leather, or rubber between the sections and having a flexible tread-tire. Fig. 2 is a cross-section of one of the perforated sections of cork, taken on line $x$ $x$, Fig. 1, and the flanged tread-tire in place in the groove on the periphery of the cork; Fig. 3, a cross-section through one of the solid cork sections, taken on line $y$ $y$ of Fig. 1. It also shows a portion of the casing out of place. Fig. 4 is a cross-section taken through the interposed piece of rawhide, leather, or rubber on line $z$ $z$ of Fig. 1; Fig. 5, a cross-section of a molded cork rim with its flexible tread and surrounded by the casing; Fig. 6, a wheel having its tire composed of a base of molded cork with flexible tread-tire. This figure, like that of Fig. 1, is shown without the casing surrounding the tire.

My invention consists in the formation of a cork base seated in the grooved rim of the wheel, arranged to support a leather, rubber, or other flexible or yielding tread-tire to contact with the ground. The cork may be made of solid cork prepared in the form of sections and placed together around the rim and provided with a groove to support the tread-tire, or it may be made of cork shavings suitably bound together and molded in form.

A is a wheel for a vehicle, represented here in the form of a bicycle-wheel. It is provided with the usual grooved periphery B, and within this groove is seated a cork base C, which entirely surrounds the wheel, as shown in Figs. 1 and 6. This cork base is grooved around its entire circumference, as shown at $c^2$. Around this groove is placed the tread-tire D. This tire may be made of rubber, leather, or other flexible or elastic material and is usually provided with flanges $d^2$ on its side to spread over and protect the cork base from injury against stones or other sharp projections. The base of the tire may be made up in sections, as shown in Fig. 1, or it may be molded of cork shavings suitably cemented or otherwise bound together and then molded in proper form, as shown in Fig. 6.

When the cork of the tire is built up in sections, they may be perforated, as shown in Fig. 2, or solid, as shown in Fig. 3. Usually I prefer to alternate them with a solid and a perforated section, lying together, and between them place a thin section or plate of rubber, rawhide, or leather, as shown at E, the purpose of which is to stop a cutting object from going too deeply into the cork base and aid in stiffening the sections and making the entire body of the cork compact. This plate is shown in Fig. 4. Its outer edge is flush with the cork sections and it is cut out below the tread-tire to allow elasticity of movement thereon.

When the cork is molded, as illustrated in Figs. 5 and 6, a good way to make it would be to take cork waste and form it together by a suitable cement, then put it into a mold of proper size and shape and mold therein the ring with its groove on the outside to receive the tread-tire. When dried, it will form a ring suitable for its purpose. If any difficulty arises in getting it into the groove of the wheel, it may be sawed in two, then put in place and the ends properly cemented together. It will be seen by this arrangement that a good stout tread-tire made of rubber, gutta-percha, leather, or other suitable material having sufficient elasticity for the purpose need not be inflated, and will thus be exempt from accidents arising from perforations or punctures.

As an additional precaution I place around the cork tire, so as to be interposed between the tread-tire on the one side and the grooved wheel-rim on the other, a wrapper or casing H, made of cloth, canvas, linen, or other light and durable material, which takes the form of the circumference of the cork base and enters the grooved seat for the tread-tire formed therein. This wrapper or casing may be glued or cemented to the cork, and when the tread-tire is put in the groove draws and tightens the casing by its own elasticity, and thereby draws the cork sections together and holds them in place and position, besides forming a good base for the coloring or varnishing material.

What I claim, and desire to secure, is—

1. A wheel-tire built up in cork sections alternating with each other to form a ring surrounding the wheel and conformed in shape to the groove in the wheel-rim, said cork base provided with a circumferential groove on its periphery in combination with a wrapper or casing enveloping the cork base and groove and an exposed endless elastic tread-tire, sprung into the groove over the wrapper whereby the wrapper is forced into the groove, thereby tightening around the base, and the cork sections are drawn together and held in place without other fastening device than the exposed tread-tire.

2. A wheel-tire built up in cork sections, alternating with each other to form a ring surrounding the wheel and conformed in shape to the groove on the wheel-rim, said cork base provided with a circumferential groove on its periphery, in combination with a wrapper or casing enveloping the cork base and groove and an exposed endless elastic tread-tire sprung into the grooves over the wrapper whereby the wrapper is forced into the groove and the cork sections drawn together without other securing device, said tread-tire provided with flanges at the sides having free ends and lying over the cork base and wrapper thereby protecting the same from cutting and adding to the elastic effectiveness of the tire.

3. A wheel-tire built up in cork sections alternating with each other to form a ring surrounding the wheel and conformed in shape to the groove in the wheel-rim, said cork base provided with a circumferential groove on its periphery, a thin stiff plate interposed between the sections conforming in shape to the cork sections having its outer edge flush with said sections, and cut out at the top, substantially as shown, in combination with a wrapper or casing enveloping the cork sections and plates, and an endless elastic tread-tire sprung into the groove over and upon the wrapper to thereby draw the plates and sections together and make the whole compact, substantially as described.

Signed at New York city, in the county of New York and State of New York, this 4th day of May, A. D. 1898.

WILLIAM LENNARD FOOTE.

Witnesses:
 J. H. CAMPBELL,
 M. TURNER.